(12) United States Patent
Fjeldstad et al.

(10) Patent No.: US 6,522,409 B1
(45) Date of Patent: Feb. 18, 2003

(54) METHOD AND DEVICE FOR NON-DESTRUCTIVE INSPECTION OF OBJECTS BY MEANS OF OPTICAL HOLOGRAPHIC INTERFEROMETRY

(75) Inventors: John Petter Fjeldstad, Sandefjord (NO); Irina Evgenievna Fjeldstad, Sandefjord (NO); Leonid Mikhailovich Lobanov, Kiev (UA); Vjacheslav Avtonomovich Pivtorak, Kiev (UA); Nikolay Georgievich Kuvshinsky, Kiev (UA); Galina Ivanovna Tkachuk, Kiev (UA); Vladimir Petrovich Kushniruk, Kiev (UA); Valeriy Aleksandrovich Pavlov, Kiev (UA); Nikolay Aleksandrovich Davidenko, Kiev (UA); Peter Dmitrievich Krotenko, Kiev (UA)

(73) Assignee: HoloTech as, Sandefjord (NO)

( * ) Notice: Subject to any disclaimer, the term of this patent is extended or adjusted under 35 U.S.C. 154(b) by 207 days.

(21) Appl. No.: 09/592,790

(22) Filed: Jun. 13, 2000

(30) Foreign Application Priority Data

Oct. 29, 1999 (NO) ................................................ 5311/99

(51) Int. Cl.$^7$ ............................. G01B 9/021; G01L 1/24
(52) U.S. Cl. ....................................... 356/457; 356/35.5
(58) Field of Search ................................ 356/457, 458, 356/35.5; 359/15

(56) References Cited

U.S. PATENT DOCUMENTS 4,781,455 A    11/1988   Machler et al.
4,798,466 A    1/1989    Bouteyre et al.
5,339,152 A  * 8/1994    Horn ........................... 356/347
5,769,993 A    6/1998    Burney

FOREIGN PATENT DOCUMENTS

| DE | 3718327 A1 | 12/1988 |
| FR | 2416452 A2 | 8/1979 |
| FR | 2543299 | 9/1984 |
| JP | 6301323 | 10/1994 |

* cited by examiner

Primary Examiner—Samuel A. Turner
Assistant Examiner—Patrick Connolly
(74) Attorney, Agent, or Firm—Birch, Stewart, Kolasch & Birch, LLP

(57) ABSTRACT

This invention relates to a method and device for non-destructive inspection by means of holographic interferometry of details, machine units, mechanisms, and various materials, which eliminates the problem of relative displacement of the object with regard to the holographic equipment, especially due to vibratory motion of the object. This is achieved by transporting the reference and object beams between the investigated object, light source, and interferometer in flexible wave guidance cables and that the end-points of the flexible wave guidance cables are securely attached in a fixed distance from the investigated object, recording medium of the interferometer and light source, respectively. This will also give the benefit of dividing the holographic interferometer into an object part and a registering part which forms the interferograms. Thus it becomes possible to perform measurements on objects in situ under any weather condition while the sensitive recording equipment of the holographic interferometer can be operated in a distant protected location.

13 Claims, 3 Drawing Sheets

METHOD AND DEVICE FOR NON-DESTRUCTIVE INSPECTION OF OBJECTS BY MEANS OF OPTICAL HOLOGRAPHIC INTERFEROMETRY

FIELD OF INVENTION

This invention relates to a method and device for non-destructive inspection, by means of holographic interferometry, of details of machine units, mechanisms, and various materials. More particularly, the invention relates to a method/device, which makes it possible to considerably decrease the requirements for protecting against vibratory movements during measurements, additionally performing insitu measurements in real time of different objects under various weather conditions.

BACKGROUND

Optical holographic interferometry makes it possible to perform non-destructive inspections of blocks and units of machines and devices for eventual presence of internal defects, as well as measuring stresses of an object during the object's work load and residual stresses caused by technological processes of welding, forging, soldering etc. These measurements are useful for such fields as offshore petroleum industry, shipbuilding industry, manufacturing industry, aircraft industry, and for all kinds of structures where loading stresses and residual stresses can result in failures.

The principle of non-destructive inspections of an area of an object by optical holographic interferometry can be described as follows: First, a hologram of the area which is to be investigated on the object is recorded and developed by a registering medium when the object is in an unloaded initial stage of stress (a description of recording holograms by a holographic interferometer is for instance given in the applicants' Norwegian application no. 19995311, which is incorporated by reference). Then one slightly reforms the investigation area of the object by applying some types of loading; for example stretching, compression, bending, twisting, heating, and combinations of one or several of these, etc. The loading is performed in such a way that the stress will be concentrated in the region where the eventual defect is located. Thereafter, the registering medium containing the developed image of the hologram and the object are simultaneously illuminated by coherent light. As a result, two light waves scattered by the investigation area before and after loading will simultaneously emerge behind the registering medium. These light waves will interfere and form an interferogram which contains a set of fringes. When the interferogram is observed, by example, the naked eye or an objective and a monitor through the registering medium, it is seen as a set of fringes which cover the investigation area during loading. In addition, a presence of areas with abnormal fringe behaviour corresponds to presence of defects in the object. With this technique, it is thus possible to reveal various types of defects such as cracks, conglutinations, incomplete fusion, voids, cavities, pores, etc.

It is also possible to employ this technique to determine load stresses and residual stresses in an investigation area of the object. For example, in the case of determining residual stresses, a hologram of the area in its initial state is registered and developed before a release of the residual stresses are performed at a small zone of the investigation area. The release of residual stresses leads to deformations in the vicinity of the zone of released stresses under the action of the residual stresses, and the value of the normal component of the surface displacement at the edge of this zone is subject of measurements since it is directly proportional to the residual stress value. Then the registering medium with the developed holographic image of the investigation area in it's initial state and the investigation area with the zone of released residual stresses, are simultaneously illuminated with coherent light. The illumination forms an interferogram from which one first determines the normal components of the surface displacements at the edge zone of released stresses. Finally, the measurements are employed to calculate the magnitude of the residual stresses. This procedure is thoroughly presented in the applicants Norwegian application no. 19995312, which is incorporated here as a reference.

The presently known methods of holographic interferometry have some drawbacks which have hindered a wide use of this technique:

1) It is necessary to rigidly protect the processes of registration of holograms and formation of interferograms from vibrations. That is, to ensure conditions which excludes any relative movement of the investigation area, laser, the elements of the interferometer, and the registering medium in regard to each other. This can, for instance, be connected to the following; The spatial carrier frequency is typically in the order of 1000–2000 $mm^{-1}$, thus a relative displacement of one of the above mentioned components by as little as 0,5–1 $\mu$m will result in a crabbing of the interference pattern of the hologram and render it's registration impossible.

2) In the cases where the registering media are films of amorphous molecular semiconductors (AMS-films), one should perform the registration and development of holograms in comfortable conditions such as an in-house location in order to satisfy the sensitivity toward humidity and temperature of the registering medium. AMS-films are subject to an electrostatic charging by corona discharges prior to registration of holograms. This is impossible in a high humidity environment or at temperatures below 0° C. Also, high quality registrations and developments of holograms becomes impossible in high humidities and low temperatures due to a surface relaxation of the variable component of the latent electrostatic image. Also, achieving an optimum heating rate of the AMS-film during development becomes impossible in such conditions.

3) The exceptional sensitivity of the holographic interferometry technique towards relative displacements of the elements of the device with respect to each other, was partially overcome by creation of devices which rigidly fastened all above-mentioned elements and the object which is to be investigated on a common base. However, a such devices appear to be unsuitable for objects which are subject to vibrations. This is partially due to the relative large number of components which have to be rigidly fastened relative to each other, and partially due to the shape and size of the object. Some objects are simply too large and heavy to be placed on a common base. Besides, these devices do not permit inspections of objects in situ.

OBJECT OF INVENTION

The main object of the invention is to provide a device and method for non-destructive inspections of objects by means of the optical holographic interferometry technique in real-time scale and which overcomes the above mentioned drawbacks.

Another object of the invention is to provide a device and method for performing non-destructive inspections of objects by means of real-time optical holographic interferometry which makes it possible to perform the loading and illumination of the investigation area of an object with coherent light in situ, while the registration, development of holograms and formation of interferograms takes place in another location.

A further object of the invention is to provide a device and method for performing non-destructive inspections of objects by real-time optical holographic interferometry which considerably reduces the requirements for vibration protection during registration and development of holograms and formation of interferograms.

It is also an object of the invention to provide a device and method for performing non-destructive inspections of objects with the use of real-time optical holographic interferometry in situ.

SHORT DESCRIPTION OF THE FIGURES

FIG. 1.

BRIEF DESCRIPTION OF THE INVENTION

Figure 1:
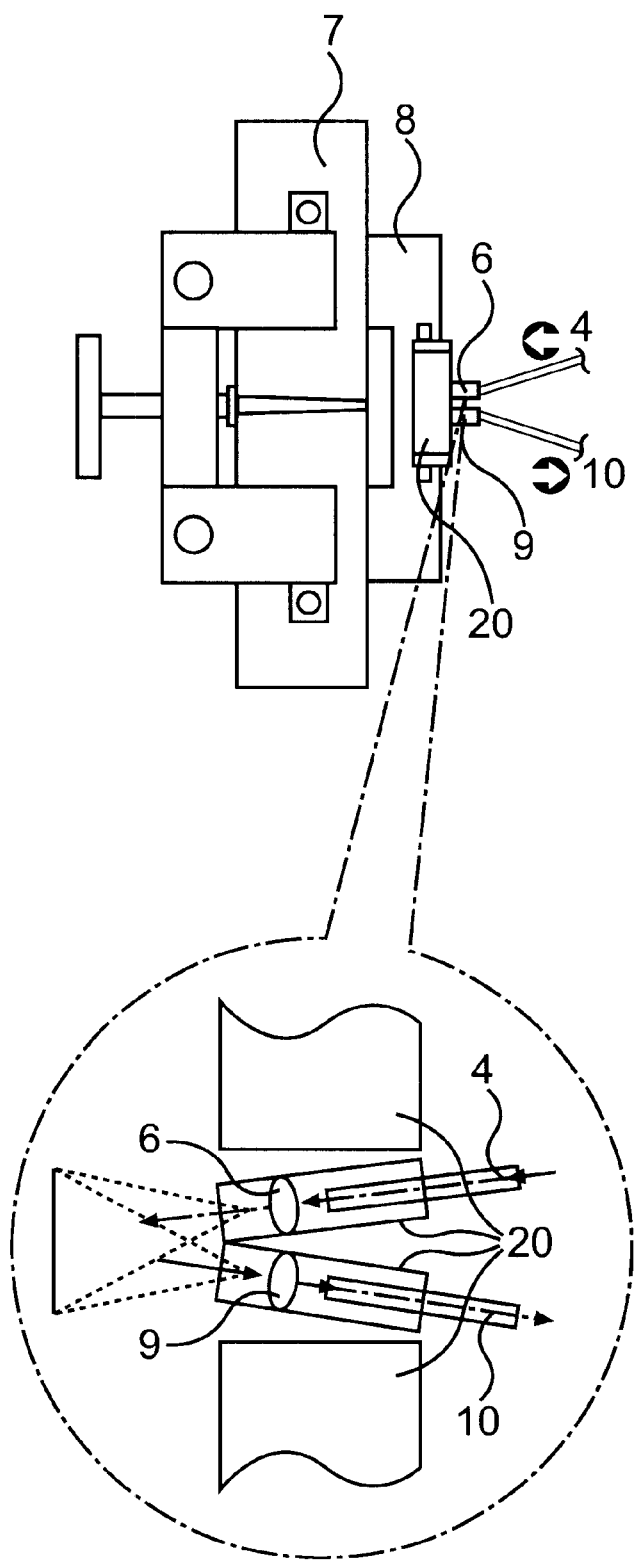
FIG. 1 shows a preferred embodiment of a holographic interferometer according to the invention and an example of a clamping and loading device for investigation of the joint of two welded half-pipes which are subject to bending loading.

The objectives of the invention can be achieved by the device and method disclosed in the appended claims and in the description given below.

The aims of considerably reducing the requirements for vibration protection and to be able to study the object in situ while registration, development of holograms and formation of interferograms takes place in another location, can be achieved by "dividing" the holographic interferometer into an object module and a holographic camera, and by ensuring that the path length of the coherent light travelling from the light source, to the object and further to the registering medium is independent of movements of the object relative to the holographic camera and/or light source. This ensures that any phase changes of the object and/or reference beam is due to changes at the surface of the object and not by a change in the distance between the object and holographic camera or light source.

A preferred way to achieve this is to transmit the part of the coherent light that constitutes the object beam from the light source to the object surface and therefrom to the holographic camera, and the part of the coherent light that constitutes the reference beam from the light source to the holographic camera in single-mode light guidance cables which are attached to optical connectors which themselves are rigidly fixed on the light source, above the investigation area of the object and holographic camera, respectively. The optical connectors above the object surface and it's attachment means can be said to constitute an object module. It is preferred to employ single-mode light guidance cables since the optical path length in such cables are practically independent of bending and twisting of the cables. In this way we eliminate the need for fixing the object in a vibration free manner relative to the holographic camera and/or the light source, since a displacement or bending of the light cabled does not lead to changes in the optical path length or accumulation of phase changes. Thus, the holographic camera, light source and object module are free to move relative to each other without leading to distortions of the interference fringes on the interferogram. The only requirement is that the optical connectors must be firmly fixed relative to the object, registering medium or light source, respectively. This is obviously a much easier task than the state of the art requirement of fixing all components, including the object in relation to each other.

Another advantage of this preferred embodiment, is that the registration and development of holograms and formation interferograms can be performed "separated" from the object. That is, there are no longer any need for ensuring that the holographic equipment do not move relative to the object, which in practice meant fixing the holographic equipment onto the object or placing all components including the object onto a vibration protected plate etc. Thus one can place the holographic camera and light source for example in a weather protected comfortable location while performing in-situ inspections of distant objects by simply adjusting the length of the light guidance cables carrying the object beam to an from the object module.

DETAILED DESCRIPTION OF THE INVENTION

Figure 2:
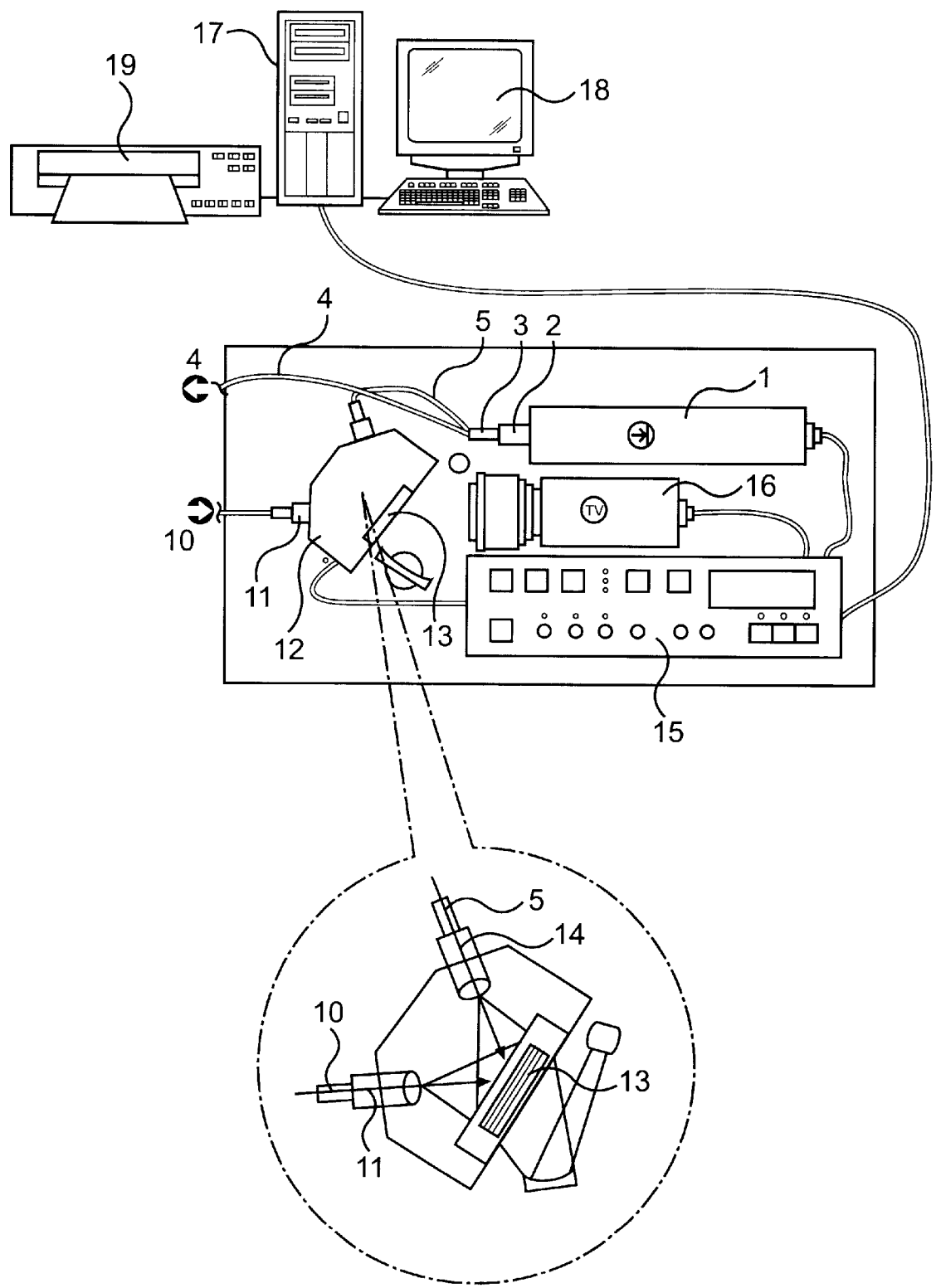
FIG. 2 shows a holographic camera.

The invention will now be described in more detail with reference to FIGS. 1–2, where FIGS. 1 and 2 show a holographic interferometer for non-destructive inspections of objects and a loading device according to a preferred embodiment of the invention. FIG. 1 shows an enlarged depicted view of the loading module which shows the optical scheme of the loading module, while FIG. 2 shows an enlarged depicted view of the holographic camera of the holographic interferometer, with optical connectors and the optical scheme for the camera. The investigation object (welded joint of two half-pipes) and the device for performing the bending loading, are of course only given as a typical example of an investigation by holographic interferometry, and shall by no means be interpreted as a limitation to this invention.

This invention relates to the method and device for performing holographic interferometry and can be applied for all kinds of objects that are mentioned in the background section given above. The size and shape of the loading device must of course be altered according to the size and shape of the object which is to be investigated and to the chosen way of loading the object in order to create stresses in the vicinity of a defect in the object. The only requirement is that the loading device should provide the necessary conditions for illuminating the investigation area of the object with coherent light by means of a first optical connector, and for collecting the coherent light that scatters off the investigation area by means of a second optical connector. Matters concerned with shaping and sizing of the loading device is within the know-how of an average skilled person, and will therefore not be further presented here. Thus, the attention will now be focused on the holographic interferometer of the device which constitutes the basis of the invention.

The holographic interferometer (see FIGS. 1–2) comprises an object module 20 situated directly on an element of the loading device 8, a holographic camera 12 with a registration medium 13, a source of coherent light laser 1 with optical connector 3 and beam splitter 3, and single-mode optical cables 4, 5, 10. The object module 20 and the holographic camera 12 comprise pairs of optical connectors 6,9 and 11,14, respectively. In addition, the device for performing non-destructive inspections of objects comprises a device for registering holograms on AMS-films 15, a TV-camera with an objective 16, a computer 17 with monitor 18, and printer 19.

From FIG. 2 we see that in the preferred embodiment, optical connector 2 is attached to the laser 1 in one end and to the beam splitter 3 in the other end, that the single-mode optical light guidance cable 4 is attached to the beam splitter 3 in one end and to the optical connector 6 in the other end, that the single-mode optical light guidance cable 5 is attached to the beam splitter 3 in one end and to the optical connector 14 in the other end, and that the single-mode optical light guidance cable 10 is attached to the optical connector 9 in one end and to the optical connector 11 in the other end. The object module 20 with optical connectors 6,9 is situated on an element of the loading device 8 in such a manner that connector 6 illuminates the investigation area of the object with the object coherent light (see FIG. 1) and such that connector 9 collects the object coherent light scattered off the investigation area. The optical connector 11 is situated on the optical camera 12 in such a manner that it directs the object beam onto the registering medium 13, while optical connector 14 is situated on the optical camera 12 in such a manner that it directs the reference beam onto the registering medium 13 (see FIG. 2). With such an arrangement, it is important that the optical connector 2 and beam splitter 3 are rigidly fixed onto the laser 1, that the optical connectors 6, 9 are rigidly fastened onto the object module 20 which itself must be rigidly fastened to the loading device 8 in a fixed distance above the investigation area of the object, and that the optical connectors 11,14 are rigidly fastened onto the optical camera in a fixed distance of the registering medium 3.

In this way we achieve that the holographic interferometer can be conceived as constituted of two parts; a holographic camera with light source and an object module, which can be placed in different location and which ensures that they are all free to move relative to each other within limits defined by the length of the optical guidance cables without imparting any changes in the optical path length of the object and/or reference beams. Thus is becomes possible to place the holographic interferometer (camera and light source) in a comfortable and/or weather protected place and perform in situ investigations off various objects regardless of their size and shape.

Let us take a look at the operation of the holographic interferometry device according to the invention for performing non-destructive inspections of objects. The procedure for registration of holograms and formation of interferograms are thoroughly described in the applicants' corresponding Norwegian application 19995311 which is incorporated as a reference and will therefore not be described in detail here. However, one should realize that registration and development of holograms on the registering medium is performed by the controlling device 15 and that the registering medium is an AMS-film made up of 91 wt % of a copolymer comprising epoxypropylcarbozole and 5 wt % buthylglycedil ether doped with 5 wt % of methyl-9-(4-dodecyl-oxyphenyl-1,3-selenathiol-2-ylidene)-2,5,7-trinitrofluorene-4-carboxylate and 5 wt % of hexadecyl-2,7-dinitro-dicyanomethylenfluorene-4-carboxylate. A discussion of the properties of AMS-films and why this film is preferred is given in the applicants' Norwegian application 19995273, which is incorporated here as a reference.

When the object module 20 is properly fastened above the investigation area, the registering medium 13 will be made ready for registration of a hologram. Then the laser is switched on and coherent light is sent via optical connector 2 into beam splitter 3 which divides the laser radiation into a coherent object and reference beam. The coherent object beam travels through single-mode light guidance cable 4 and enters into optical connector 6 of the object module 20. The connector 6 expands and directs the object beam such that it illuminates the investigation area of the object 7. The part of the object beam that reflects off the surface of the investigation area is collected by connector 9 of the object module 20, from which it enters and travels through the single-mode light guidance cable 10. The object beam will then enter optical connector 11 of the holographic camera 12. The optical connector 11 directs and expands the object beam such that it illuminates the registering medium 13. At the same time, the coherent reference beam is sent to optical connector 14 of the holographic camera 12 by means of the single-mode light guidance cable 5. The optical connector 10 will direct and expand the reference beam 15 such that it illuminates the registering medium 13. Thus the object and reference beam interfere on the surface of the registering medium 13, and form a hologram of the investigation area of the object. This hologram is registered and developed into a latent image on the registering medium.

Next, the investigation area of the object is subject to a load, in this case a slight bending deformation with use of the loading device 8. Thereafter, the registering medium 13 containing the developed holographic image and the investigation area of the object are simultaneously illuminated by the reference and object beam, respectively. As a result, two light waves will simultaneously appear behind the registering medium 13, one of which corresponds to the object light wave scattered by the investigation area of the object before loading, while the other corresponds to the light wave scattered by the investigation area of the object after loading. These light waves will interfere and form an interferogram of the investigation area of the object, which can be observed by a naked eye when seeing through the registering medium or by a TV-camera 16 and display 18. Defect areas correspond to areas of the interferogram with abnormal behaviour of the interference fringes.

Figure 3:
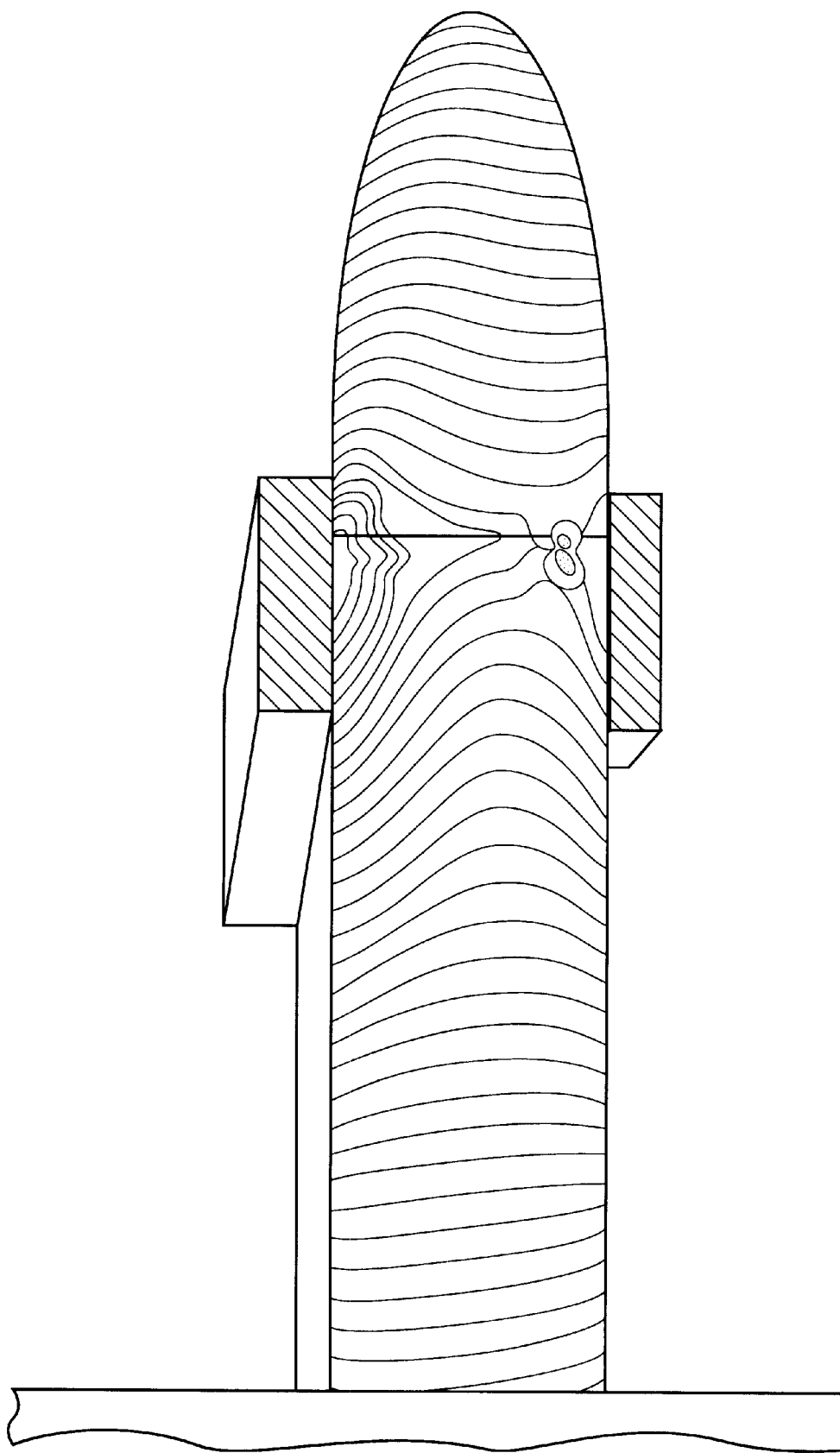
FIG. 3 is an ink and pen drawing of an interferogram from an area of a welded seam of a titanium pipe of 12 mm diameter which is exposed to bending deformation.

An interferogram from an investigation area of the object—welded seam of a titanium pipe of 12 mm diameter, is presented in FIG. 3 as an example. An area with abnormal behaviour of interference fringes, which corresponds to the area of localization of a defect, can be seen on this welded seam.

The device and method for non-destructive real-time inspection of objects by use of holographic interferometry according to this invention eliminates the above mentioned drawbacks accompanying the presently known devices and methods of non-destructive inspections of objects by holographic interferometry.

The possibility for performing the illumination of an investigation area of an object with a coherent light and collection of coherent light scattered off by the investigation area in situ, while the hologram formation of the investigation area, the registration and development of the hologram, and formation of interferograms takes place in comfortable protected location enables one to considerably extends the scope of application of holographic interferometry technique for non-destructive inspection of objects. Thus it becomes possible to perform non-destructive inspections of objects in situ under any weather condition, even underwater, in plasma and under influence of high radioactivity.

The use of single-mode light guide optic cables (i) for transmitting coherent light from a laser to an investigation area of an object, (ii) for transmitting the coherent light scattered off by the investigation area to the place where a hologram forms, (iii) for transmitting coherent light from a laser to the place where a hologram forms, allows a much easier practical realisation of the illumination of an object with a coherent light and collection of light scattered off the object in situ, while the hologram formation and its registration and development, formation of an interferogram takes place in another comfortable protected location. In the same time this allow a considerable reduction of the requirements for protecting the measurements against vibrations, since vibrations in the object no longer influences the registering medium, elements of the holographic camera and laser. Additionally, elements of the holographic camera and registering medium are not mechanically fastened to a laser, therefore relative movements of the laser and holographic camera will not influence each other. Also, any shifts or bends of single-mode light guide optic cables will not result in change of the optical passlength or in additional accumulation of phase.

Although this invention has been described in terms of a preferred embodiment and one example of fastening and loading the object, one should understand that one can create a vast number of fastening and/or loading devices for a variety of objects where this invention can be applied. These are all obvious for a skilled person in the art, and should therefore be considered as included in the main scope of this invention.

What is claimed is:

1. A method for non-destructive inspection of an investigation area of an object by use of optical holographic interferometry technique in real-time scale:
   registering a first hologram of the investigation area of the object;
   developing the first hologram in a registering medium in a holographic camera;
   loading the investigation area of the object; and
   simultaneously illuminating both the investigation area of the object and the registering medium containing the developed holographic image of the investigation area of the object in the initial state with coherent light, thus forming an interferogram of the investigation area of the object as a result of interference between the two light waves which corresponds to the light waves scattered off the investigation area of the object before and after loading, where the illumination of the investigation area on the object with coherent light and the collection of the coherent light which scatters off the same area are performed at the object insitu while the registration and development of the holographic image and formation of the interferogram of the investigation area of the object are performed in another location in a distance from the object by transporting the coherent light between the light source, investigation area of the object and holographic camera in a single-mode light guidance cables, and where the formation of the holographic image and interferogram of the investigation area are protected from relative displacements of the object, holographic camera and/or light source by transporting the coherent light between the object, light source, and holographic camera in single-mode light guidance cables, and by ensuring that the endpoints of the single-mode light guidance cables are securely attached a fixed distance from an object module containing the investigation area of the object, and between the recording medium of the holographic camera and light source, respectively.

2. A method according to claim 1, where the registration and development of the holographic image and formation of the interferogram of the investigation area of the object are performed in a location with a protected environment which is suited for amorphous molecular semiconductor registering media.

3. A method according to claim 1, where a relative displacement of the object, light source, and holographic camera are small movements and/or vibrations.

4. A device for performing real-time non-destructive investigations of an object by use of the optical holographic interferometry technique in real-time scale, comprising:
   a source of coherent light;
   a holographic interferometer;
   a registering medium;
   a device for loading the object which is to be investigated; and
   auxiliary devices for observation and processing of the resulting interferograms,
   where the holographic interferometer is divided into an object module, a holographic camera, and a source of coherent light, and where the light source is connected to the object module by single-mode light guidance cable, the object module and the holographic camera are connected by single-mode light guidance cable, and the holographic camera and the light source are connected by a single-mode light guidance cable, and where the holographic camera is made independent upon relative displacements of the light source and object module by ensuring that the endpoints of the single-mode light guidance cable are securely attached a fixed distance from the object module containing the investigation area of the object, and between the recording medium of the holographic camera and light source, respectively.

5. A device according to claim 4, where the single-mode light guidance cable has endpoints, the endpoints of the single-mode light guidance able are attached to optical connectors, an optical connector is rigidly attached to the light source and is equipped with a beam splitter which splits the coherent light into an object and a reference beam, an optical connector is rigidly attached to the object module a fixed distance above the investigation area of the object such that it directs and expands the object beam onto the investigation area of the object, an optical connector is rigidly attached to the object module a fixed distance above the investigation area of the object such that it collects the coherent light that reflects off the investigation area of the object and focuses the beam into a single-mode light guidance cable, an optical connector is rigidly attached to the holographic camera in a fixed distance above the registering medium such that it directs and expands the object beam onto the registering medium, and an optical connector is rigidly attached to the holographic camera a fixed distance above the registering medium such that it directs and expands the reference beam onto the registering medium.

6. A device according to claim 4, where the holographic camera and light source are placed in a location with a protected environment which is suited for amorphous semiconductor registering media.

7. A device according to claim 4, where the distance between the object module and the holographic camera with light source can be adjusted to any length by simply adapting the length of the single-mode light guidance cables accordingly.

8. A method of real-time optical holographic interferometer inspection comprising:

providing an object, having an investigation area, and an initial state;

registering a first hologram, of the investigation area, on a registering medium, where said object is at the initial state; and illuminating the investigation area forming a second hologram, where said object is subject to loading beyond the initial state, where illumination of the registering material forms said first hologram such that said first hologram and second hologram interfere forming an interferogram, where illumination of the investigation area and illumination of the registering material occur at separate locations and the light for illumination is provided by a light source and conveyed to and from the object to the registering material by single-mode light guidance cables, and where the single-mode light guidance cables have ends carrying illumination to and from said object, to and from said registering material, and to and from the light source, where the positions of the ends attached to a object module are fixed with respect to the object module.

9. The method according to claim 8, wherein the registering material is an amorphous molecular semiconductor.

10. The method according to claim 8, wherein the relative positions of said object, the registering material, and the light source varies by small movements and/or vibrations.

11. A device for performing real-time holographic interferometry comprising:

a camera, containing a registering material for capturing holographic images and emitting holograms upon illumination;

a light source, providing coherent light; and single-mode light guidance cables, wherein said cables convey light from said light source to illuminate and reflect off an object, where said cables convey a reference illumination and the reflected light off of the object to the registering material to register a first hologram signifying an initial state of the object, where said cables convey the reflected light from a different state of the object to the region of the registering material, and where upon illumination of the registering material the first hologram is formed and interferes with the reflected light from the different state to form a interferogram, and where the single-mode light guidance cables have ends carrying illumination to and from said object, to and from said registering material, and to and from the light source, where the positions of the ends attached to an object module are fixed with respect to the object module.

12. The apparatus according to claim 11, wherein the registering material is an amorphous molecular semiconductor.

13. The apparatus according to claim 11, wherein the relative positions of the object, the registering material, and the light source varies by small movements and/or vibrations.

* * * * *